United States Patent [19]

Matsuda et al.

[11] Patent Number: 4,627,670

[45] Date of Patent: Dec. 9, 1986

[54] HYDRAULIC BRAKING PRESSURE CONTROL APPARATUS FOR VEHICLES

[75] Inventors: Shohei Matsuda, Utsunomiya; Makoto Sato, Kamifukuoka, both of Japan

[73] Assignee: Honda Giken Kogyo Kabushiki Kaisha, Tokyo, Japan

[21] Appl. No.: 755,502

[22] Filed: Jul. 16, 1985

[30] Foreign Application Priority Data

Jul. 17, 1984 [JP] Japan .................................. 59-148235
Jul. 17, 1984 [JP] Japan .................................. 59-148237
Nov. 5, 1984 [JP] Japan .................................. 59-232562

[51] Int. Cl.⁴ ............................................... B60T 8/02
[52] U.S. Cl. ..................... 303/115; 303/116
[58] Field of Search ............ 303/115, 116, 119, 61–63, 303/68–69, 92, 10–12, 113, 6 C, 6 R; 188/181 A, 181 R, 349

[56] References Cited

U.S. PATENT DOCUMENTS 3,905,654 9/1975 Tribe .................................. 303/115
4,095,851 6/1978 Ando et al. ........................ 303/115

Primary Examiner—Douglas C. Butler
Attorney, Agent, or Firm—Armstrong, Nikaido, Marmelstein & Kubovcik

[57] ABSTRACT

In a hydraulic braking pressure control apparatus disposed in an oil passage transmitting a hydraulic pressure outputted from a master cylinder to a wheel brake and adapted to control the transmission of that hydraulic pressure when a wheel is about to be locked, there are provided a first valve mechanism adapted to cut off, only during the supplying of a liquid pressure into a control chamber, the communication between an input hydraulic chamber adapted to receive a hydraulic pressure from the master cylinder and an output hydraulic chamber adapted to supply a hydraulic pressure to the wheel brake in accordance with the input hydraulic pressure, and a second valve mechanism adapted to bring the input and output hydraulic chambers, which are disconnected from each other upon the supply of the liquid pressure, into communication with each other when the hydraulic pressure in the output hydraulic chamber has been reduced less than a predetermined value.

11 Claims, 13 Drawing Figures

AMOUNT OF DISPLACEMENT

AMOUNT OF DISPLACEMENT

AMOUNT OF DISPLACEMENT

HYDRAULIC BRAKING PRESSURE CONTROL APPARATUS FOR VEHICLES

BACKGROUND OF THE INVENTION

1. Field of the Invention

This invention relates to a hydraulic braking pressure control apparatus for vehicles, and more particularly to an apparatus having an input hydraulic chamber communicating with an output port of a master cylinder, and an output hydraulic chamber communicating with a wheel brake and being adapted to generate a hydraulic braking pressure in accordance with a hydraulic pressure in the input hydraulic chamber, wherein the volume of the output hydraulic chamber can be increased in accordance with the supply of a hydraulic control pressure from an anti-lock control means to a control chamber when a wheel is about to be locked.

2. Description of the Prior Art

In a conventional hydraulic braking pressure control apparatus for vehicles, a piston is operated and moved in response to the introduction of a hydraulic pressure into an input hydraulic chamber so as to reduce the volume of an output hydraulic chamber and thereby generate a hydraulic braking pressure from the output hydraulic chamber in accordance with the pressure in the input hydraulic chamber. During an anti-lock control operation, the piston is displaced in a direction opposite to that in the abovementioned case by means of a control liquid pressure supplied to a control chamber, to increase the volume of the output hydraulic chamber.

In the above conventional hydraulic braking pressure control apparatus, a hydraulic braking system is divided into two parts, one of them extending from a master cylinder to an input hydraulic chamber, and the other extending from an output hydraulic chamber to a wheel brake. Accordingly, when supplying a working oil to the hydraulic braking system, it is required that those two parts be charged with the oil separately. Moreover, since the piston is in operation at all times during a braking operation, the number of its operation strokes increases to a high level. This may lead to deterioration of the durability of the control apparatus.

The assignee of the present invention has already proposed a hydraulic control apparatus provided with a valve mechanism of a normally opening type in a partition located between input and output hydraulic chambers, which valve mechanism is adapted to disconnect the input and output hydraulic chambers from each other during an anti-lock control operation, in order to integrate the hydraulic braking system into a single line extending from a master cylinder to a wheel brake, thereby facilitating a working oil charging operation and reducing the number of strokes of a piston to improve the durability of the control apparatus.

According to such a hydraulic control apparatus, the above-mentioned problems can be solved. However, when the vehicle runs on a bad road, or when the vehicle is braked excessively due to the trouble of an anti-lock control means, the abnormal increase of the hydraulic pressure in a control chamber causes the volume of the input hydraulic chamber to decrease abnormally and that of the output hydraulic chamber to increase abnormally. For this reason, the working oil in the input hydraulic chamber may be returned to the master cylinder more than necessary, and kicking-back may occur in a brake pedal more than necessary. In addition, a negative pressure may be developed in the hydraulic system between the output hydraulic chamber and wheel brake to cause the generation of trapped air bubbles.

SUMMARY OF THE INVENTION

The present invention has been provided with such circumstances in view. It is an object of the present invention to provide a hydraulic braking pressure control apparatus for vehicles wherein when the hydraulic pressure in an output hydraulic chamber becomes level lower than a set value, a working oil in an input hydraulic chamber is passed into the output hydraulic chamber to prevent kicking-back from occurring in a brake pedal more than necessary and also prevent the hydraulic pressure in the output hydraulic chamber from being reduced to such a low level as causing a problem for practical use.

To attaining the above object, according to the present invention, there is proposed a hydraulic braking pressure control apparatus for vehicles, comprising an input hydraulic chamber communicating with an output port of a master cylinder, and an output hydraulic chamber communicating with a wheel brake and adapted to generate a hydraulic braking pressure corresponding to the hydraulic pressure of the input hydraulic chamber, the output hydraulic chamber being adapted to be enlarged in volume in accordance with a hydraulic control pressure supplied from anti-lock control means to a control chamber when a wheel is about to be locked, wherein provided between the input and output hydraulic chambers are a first valve mechanism adapted to be closed in response to the increase in liquid pressure of the control chamber and a second valve mechanism adapted to be opened when the hydraulic pressure of the output hydraulic chamber has been reduced to a level lower than a set value.

With the above arrangement, since provided between the input and output hydraulic chambers are the first valve mechanism adapted to be closed in response to the increase in liquid pressure of the control chamber and a second valve mechanism adapted to be opened when the hydraulic pressure of the output hydraulic chamber has been reduced to a level lower than a set value, a hydraulic path is established extending from the master cylinder to the wheel brake with the first valve mechanism remaining opened, when the anti-lock control means is non-operative, thus making it possible to effect the charging of a working oil into a hydraulic braking system at one time, and to decrease the number of strokes of the piston to improve the durability. In addition, when the control liquid pressure in the control chamber increases abnormally, and the hydraulic pressure in the output hydraulic chamber becomes smaller than a set value, the second valve mechanism is opened to permit the communication between the input and output hydraulic chambers and therefore, the hydraulic system between the output hydraulic chamber and the wheel brake can be prevented from being reduced in hydraulic pressure to such a negative level as causing a practical problem, while at the same time, a large kickback can be prevented from occurring in a brake pedal.

Additionally, a second piston may be provided for movement relative to the piston rod, and a spring for biasing the second piston in the direction opposite to the direction of action of the hydraulic pressure in the output hydraulic chamber may be disposed to have a set load which will not vary due to the movemet of the piston rod, so that when the biasing force of this spring overcomes the hydraulic pressure in the output hydraulic chamber to cause the second piston to move relative to the piston rod, the second valve mechanism may be opened to bring the input and output hydraulic chambers into communication with each other. In such a case, it is possible to easily determine the specification of the aforesaid spring depending on a set hydraulic pressure in the output hydraulic chamber for opening the second valve mechanism.

Further, the aforesaid spring may be designed to be able to exhibit a larger spring force with a short displacement at the start of relative movement of the second piston and to exhibit a smaller spring force with a relative long displacement after the start of the relative movement and if so, the second piston can be smoothly moved overcoming the sliding resistance against the piston rod. Furthermore, since the spring exhibits a smaller spring force with a relative long displacement, even though the hydraulic pressure in the output hydraulic chamber is reduced during anti-lock control operation when the vehicle is travelling on a frozen road, the second piston will not relatively move until the second valve mechanism is opened, thereby to insure a reliable anti-lock operation.

BRIEF DESCRIPTON OF THE DRAWINGS

The above and other objects, features and advantages of the invention will become apparent from reading of the following description taken in conjunction with the accompanying drawings of several embodiments of the present invention, in which:

FIG. 4 is a view in entire vertical section;

FIG. 5 is an enlarged view in vertical section of the details of the third embodiment;

FIG. 6 is a sectional view taken along the line VI—VI of FIG. 5;

FIGS. 7 and 8 show the characteristics of first and second spring elements constituting a second spring;

FIG. 9 shows the characteristic of the second spring as a whole;

FIG. 10 is an enlarged view in vertical section of the details, corresponding to FIG. 5;

FIGS. 11 and 12 show the characteristics of first and second spring elements constituting second spring.

DESCRIPTION OF THE PREFERRED EMBODIMENTS

Figure 1:
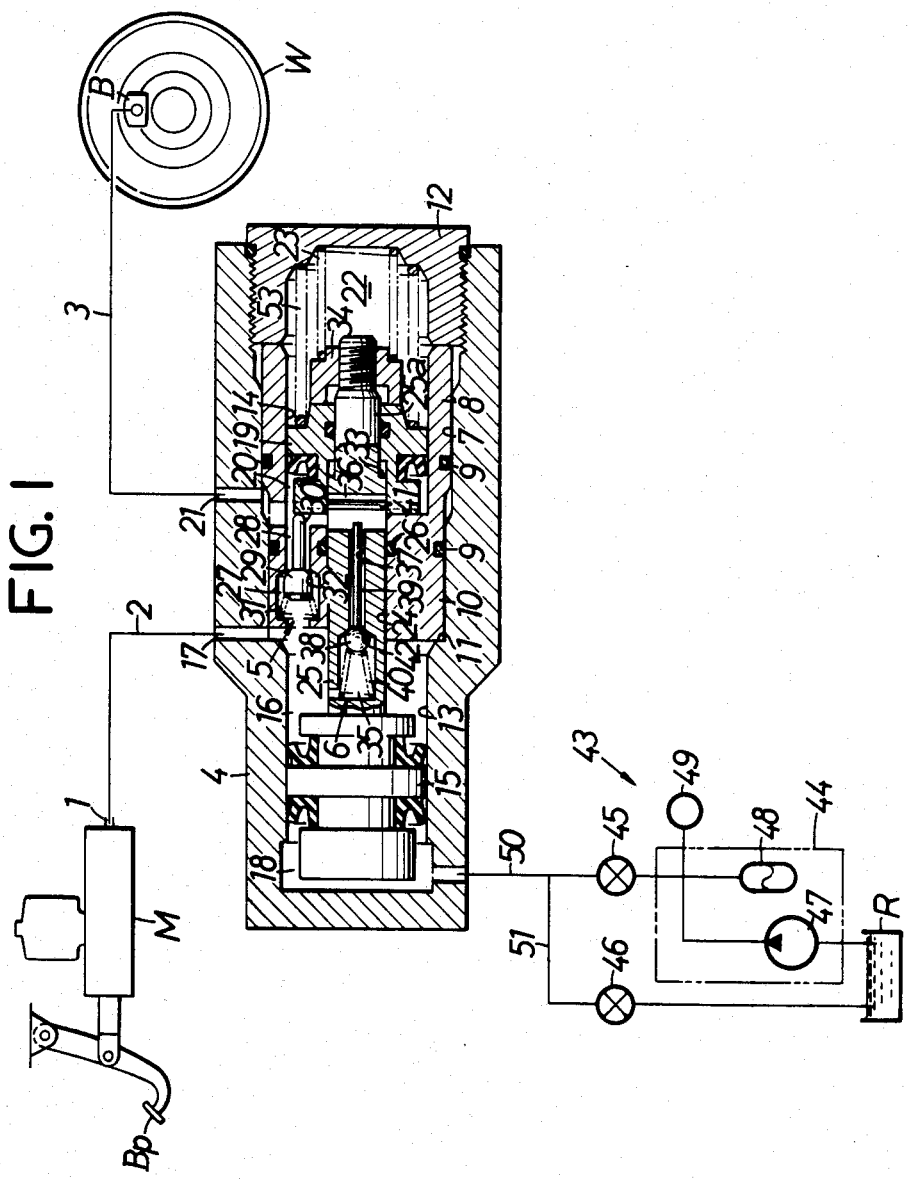
FIG. 1 is a vertical sectional view of the whole of a hydraulic braking pressure control apparatus according to a first embodiment.

Several embodiments of the present invention will now be described with reference to the drawings, in which like reference characters denote like parts.

Referring to FIG. 1 illustrating a first embodiment, a casing 4 is interposed between an oil passage 2, which extends from an output port 1 of a master cylinder M, and an oil passage 3 which is connected to a wheel brake B attached to a wheel W.

The casing is provided therein with a one-end opened bore 7 in which a bottomed cylindrical partition member 8 is fitted through O-rings 9, 9 interposed between the inner surface of the bore 7 and the outer surface of the partition member 8. The partition member 8 is fitted from its bottom portion, which constitutes a partition 10, into the bore 7 toward the other end thereof until the partition 10 has reached an intermediate portion of the bore 7, where the partition member 8 is supported on a stepped portion 11 provided at the intermediate portion of the bore 7 and facing the open end thereof. A cap 12 is screwed into the bore 7 at the open end thereof. The cap 12 is tightened while being in abutment against the open end of the partition member 8 to such an extent that the partition member 8 is pressed against the stepped portion 11. Thus, within the casing 4 defined a first cylinder portion 13 and a second cylinder portion 14 via the partition 10, the latter portion 14 being within the partition member 8.

A first piston 15 is fitted slidably in the first cylinder portion 13. An input hydraulic chamber 16 is defined between the first piston 15 and the partition 10 and communicates with the oil passage 2 via an inlet passage 17 provided in the side wall of the casing 4. On the opposite side of the first piston 15 with respect to the input hydraulic chamber 16, a control chamber 18 is defined by the first piston 15 and the end wall of the first cylinder portion 13.

A second piston 19 having the same diameter as that of the first piston 15 is slidably fitted in the second cylinder portion 14. An output hydraulic chamber 20 is defined between the second piston 19 and the partition 10 to communicate with the oil passage 3 via an outlet oil passage 21 which is defined to extend through the side wall of the partition 8 and the casing 4. A spring chamber 22 opened to the atmosphere is defined between the second piston 19 and the cap 12. The spring chamber 22 may be formed fully closed if air is completely blocked from entering the output hydraulic chamber 20 from the spring chamber 22 due to the rightward movement of the second piston 19 or change in temperature A piston rod 25 is inserted for axial movement in a through bore 24 provided in the central portion of the partition 10 with an O-ring 26 interposed therebetween. The first piston 15 is integrally provided at one end of the piston rod 25. The second piston 19 is also mounted on the other end of the piston rod 25 for axial relative movement therebetween in a limited range. More specifically, the piston rod 25 has a smaller diameter portion 25a provided at a portion corresponding to the second cylinder portion 14 through a restricting stepped portion 33 facing the spring chamber 22. The second piston 19 is slidably fitted on the smaller diameter portion 25a which has a nut 34 screwed to the end thereof. Accordingly, the second piston 19 can relatively move in the axial direction relative to the piston rod 25 between the restricting stepped portion 33 and nut 34.

A first spring 23 is mounted in the spring chamber 22 between the nut 34, i.e., piston rod 25 and the cap 12 to bias the piston rod 25 toward the control chamber 18. A second spring 53 is also provided in the spring chamber 22 between the second piston 19 and the cap 12 to bias the second piston toward the partition 10.

A first valve mechanism 5 is provided in the partition 10. The first valve mechanism 5 comprises a valve chamber 27 provided in the partition 10 in communication with the input hydraulic chamber 16, a valve bore 28 defined to extend between the valve chamber 27 and the output hydraulic chamber 20, a spherical valve body 29 housed in the valve chamber 27 to close or open the valve bore 28, a drive rod 30 integral with the valve body 29 and extending through the valve bore 28 to protrude into the output hydraulic chamber 20, and a spring 31 housed in the valve chamber 27 to bias the valve body 29 toward the valve bore 28. A conical valve seat 32 is provided at the end face of the valve chamber 27 on the side of the valve bore 28 and gradually decreases in diameter as it proceeds to the valve bore 28. The length of the drive rod 30 is set at a sufficient value such that it is urged by the second piston 19 to move the valve body 29 away from the valve seat 32 when the second piston 19 has been displaced by its maximum stroke to the partition 10.

A second valve mechanism 6 is provided within the piston rod 25. The second valve mechanism 6 comprises a valve chamber 35 which is normally in communication with the input hydraulic chamber 16, a passage 36 which is normally in communication with the output hydraulic chamber 20, a valve bore 37 connecting the valve chamber 35 with the passage 36, a spherical valve body 38 contained in the valve chamber 35 to close or open the valve bore 37, a drive rod 39 inserted into the valve bore 37 with one end thereof adapted to abut against the valve body 38 and with the other end thereof projecting into the passage 36, a spring 40 for biasing the valve body 38 contained in the valve chamber 35 toward the valve bore 37, and an urging member 41 integrally provided on the second piston 19 and inserted into the passage 36 so as to be engageable with the other end of the drive rod 39.

The end face of the valve chamber 35 on the side of the valve bore 37 is provided with a conical valve seat 42 which gradually decreases in diameter toward the valve bore 37. The length of the drive rod 39 is set such that when one end thereof is in abuttment against the valve body 38 which is under the opened state, the other end thereof projects a given length into the passage 36. Therefore, when the second piston 19 is moved more than a given distance relative to the piston rod 25 away from the nut 34 toward abutting against the restricting stepped portion 33, the valve body 38 of the second valve mechanism 6 is moved away from the valve seat 42 to open the valve.

Anti-lock control means 43 is connected to the control chamber 18. The anti-lock control means 43 comprises a hydraulic pressure source 44, a first solenoid valve 45 which is normally closed and a second solenoid valve 46 which is normally open. The hydraulic pressure source 44 is constituted of a hydraulic pump 47 for pumping a control liquid, for example, a pressurized oil from an oil tank R, an accumulator 48 and a hydraulic pressure sensor 49 for sensing the trouble and loss of hydraulic pressure of the hydraulic pump 47 as well as the operational start and stoppage of the hydraulic pump 47.

The first solenoid valve 45 is provided in a feeding oil passage 50 connecting the hydraulic pressure source 44 with the control chamber 18, and the second solenoid valve 46 is disposed in a return oil passage 51 which branches from the feeding oil passage 50 at a location between the first solenoid valve 45 and the control chamber 18 and leads to the oil tank R.

In such anti-lock control means 43, the first solenoid valve 45 is normally closed and the second solenoid valve 46 is normally open, but the second solenoid valve 46 is closed and the first solenoid valve 45 is open when it has been sensed by a sensor not shown that the wheel W has been ready to be brought into a locked state. Therefore, the control chamber 18 is normally in communication with the oil tank R, and when the wheel W is about to be locked, an anti-lock control hydraulic pressure is supplied to the control chamber 18 from the source 44.

The operation of this embodiment will now be described. When the hydraulic braking pressure control apparatus is non-operative with the brake pedal Bp being not depressed, the second piston 19 is displaced leftwardly by the spring force of the second spring 53 until it abutts against the partition 10. In the first valve mechanism 5, the drive rod 30 is pressed by the second piston 19 and the valve body 29 is moved away from the valve seat 32 to open the valve. Thereupon, a hydraulic path is established which is connected from the output port 1 of the master cylinder M through the oil passage 2, the inlet oil passage 17, the input hydraulic chamber 16, the valve chamber 27, the valve bore 28, the output hydraulic chamber 20, the outlet oil passage 21 and the oil passage 3 to the wheel brake B. This enables the charging of the working oil in the hydraulic braking system to be extremely easily effected as in the hydraulic apparatus which is not provided with the first valve mechanism 5 for anti-lock control. The charging of the working oil had to be effected separately and independently for a hydraulic path extending from the master cylinder M to the input hydraulic chamber 16 and for a hydraulic path extending from the output hydraulic chamber 20 to the wheel brake B in the prior art, but on the contrary, the braking hydraulic pressure path extending from the master cylinder M to the wheel brake B is established according to the present invention. Therfore, once the working oil is charged from the master cylinder M, the path leading to the wheel brake B is filled with the working oil.

As the braking operation is effected by the brake pedal Bp, the braking hydraulic pressure from the output port 1 of the master cylinder M is supplied via the above-mentioned hydraulic path to the wheel brake B. In this case, because no control liquid pressure is supplied from the anti-lock control means 43 to the control chamber 18, the second piston 19 remains displaced by its maximum stroke toward the partition 10 by the spring force of the second spring 53, and the first valve mechanism 5 remains to be opened. In this manner, the braking hydraulic pressure is directly supplied from the master cylinder M to the wheel brake B and hence, a piston-stroke switch which has been required in the prior art can be omitted, and the leakage of hydraulic pressure can be sensed by means used similarly in a braking hydraulic apparatus having no anti-lock control mechanism.

When the braking force is too large during braking operation and the wheel W is about to be locked, the second solenoid valve 46 is closed, and the first solenoid valve 45 is opened, so that an anti-lock control fluid pressure from the fluid pressure source 44 is supplied into the control chamber 18. This causes the first piston 15 and the piston rod 25 to be urged and moved rightwardly against the leftward biasing force of the first spring 23 and the hydraulic pressure in the input hydraulic chamber 16. In this case, the second piston 19 is moved along with the piston rod 25 in the state of abutting against the nut 34 until the rightward moving force by the hydraulic pressure in the output hydraulic chamber 20 is balanced with the leftward moving force of the second spring 53. With this rightward movement, the second piston 19 is moved away from the partition 10, so that the valve body 29 of the first valve mechanism 5 is seated against the seat 32 to close the valve, thereby blocking the supply of the braking hydraulic pressure to the wheel brake B and permitting the volume the output hydraulic chamber 20 to be increased. This results in a reduced braking hydraulic pressure to prevent the wheel W from coming into the locked state.

The following is the description of the operation of this embodiment when the vehicle runs on a bad road, or when the vehicle is braked excessively due to the trouble of the anti-lock control means 43. During unbraking operation, the first piston 15 and the piston rod 25 are moved rightwardly by the increasing fluid pressure in the control chamber 18 against the spring force of the first spring 23, but the second piston 19 is kept by the spring force of the second spring 53 from moving rightwardly and moves leftwardly relative to the piston rod 25. In the second valve mechanism 6, this causes the urging member 41 integral with the second piston 19 to urge the drive rod 39 so that the valve body 38 is moved away from the valve seat 42 to open the valve. Thereupon, the input hydraulic chamber 16 is brought into communication with the output hydraulic chamber 20, and the pressure in the output hydraulic chamber 20 is prevented from reducing to such a low level as causing a problem for practical use. In this case, the relative movement of the second piston 19 to the piston rod 25 occurs until the second piston 19 abuts against the restricting stepped portion 33. Thereafter, the second piston 19 moves leftwardly along with the piston rod 25.

When the braking operation is effected in such state, the braking hydraulic pressure which has been supplied from the master cylinder M into the input hydraulic chamber 16 is conducted through the second valve mechanism 6 into the output hydraulic chamber 20 to act on the wheel brake B through the oil passage 3. In this case, when the rightward moving force for the second piston 19 by the hydraulic pressure in the output hydraulic chamber 20 becomes larger than the leftward moving force therefore by the spring force of the second spring 53, the second piston 19 moves relative to the piston rod 25 until it abuts against the nut 34, thereafter the similar operation to that during the above-mentioned braking is conducted.

Assume that the hydraulic control pressure within the control chamber 18 has increased abnormally during the braking operation. Then, the piston rod 25 is moved rightwardly, and the second piston 19 is moved rightwardly therewith until the leftward moving force therfor by the hydraulic pressure of the output hydraulic chamber 20 is balanced with the leftward moving force therefore by the spring force of the second spring 53. When the piston rod 25 is further moved rightwardly, the second piston 19 is displaced leftwardly relative to the piston rod 25, thereby allowing the second valve mechanism 6 to be opened. This prevents the hydraulic pressure within the output hydraulic chamber 20 from being reduced to such a negative level as causing a practical problem. Excessive amount of oil more than a required level to be removed out of the input hydraulic chamber 16 for a proper anti-lock operation is passed into the output hydraulic chamber 20, so that kicking-back can not occur in the brake pedal Bp more than that required for anti-lock control operation.

In the above arrangement, the diameter of the second piston 19 may be larger than that of the first piston 15, and in that case, it is possible to provide the first valve mechanism 5 with an opening and closing function for antilock control operation and a function as a proportional reducing valve.

Figure 2:
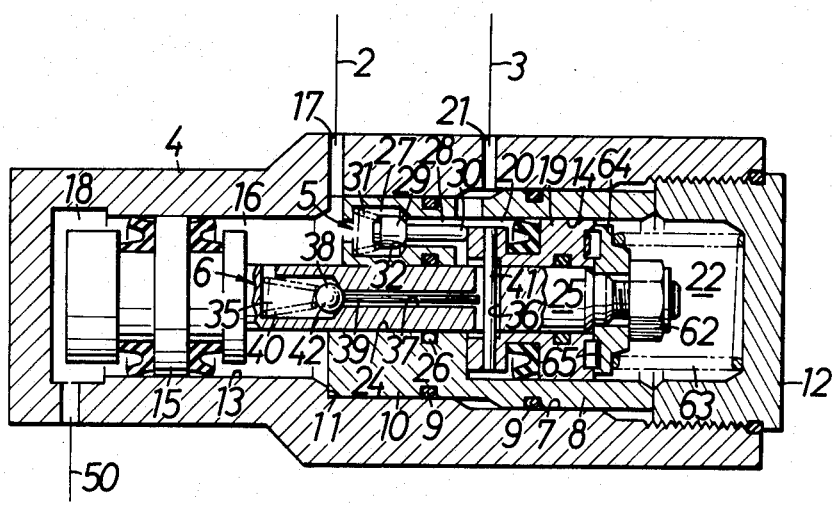
FIG. 2 is a view in vertical section of the whole of an apparatus according to a second embodiment.

FIG. 2 shows a second embodiment according to the present invention. In this embodiment, the restricting stepped portion 33 for restricting the relative movement of the second piston 19 in a limited range and the smaller diameter portion 25a are not provided on the piston rod 25 as in the first embodiment, but such relative movement is restricted by the abutting of the urging member 41 against one side wall of the passage 36 on the side of the partition 10.

A receiving member 64 is fixedly held by a nut 62 on an end of the piston rod 25 apart from the partition 10 for inhibiting falling off of the second piston 19.

A first spring 63 is interposed between the receiving member 64, i.e., piston rod 25 and the cap 12. The piston rod 25 is biased toward the partition 10 by the spring force of the spring spring 63. A second belleville spring 65 having a set load smaller than that of the first spring 63 is interposed between the receiving member 64 and the second piston 19 to bias the second piston 19 away from the receiving member 64, i.e., toward the partition 10.

Therefore, because the second spring 64 of this embodiment is interposed between the receiving member 64 and the second piston 19, the set load of the second spring does not vary depending on the change in relative position between the piston rod 25 and the cap 12 as in the first embodiment, and is always maintained at a given value. For this reason, the hydraulic pressure in the output hydraulic chamber 20 at the time when the second piston 19 is moved relatively to the piston rod 25 is subjected to only the influence of a sliding resistance such as a sealing member between the second piston 19 and the piston rod 25, leading to a facilitated determination of the specification of the second spring 65 for moving the second piston 19 relative to the piston rod 25 to open the second valve mechanism 6.

The arrangement other than that described above is the same as in the first embodiment and therefore, it will be of course understood that the operation is similar to that in the first embodiment.

Figure 3:
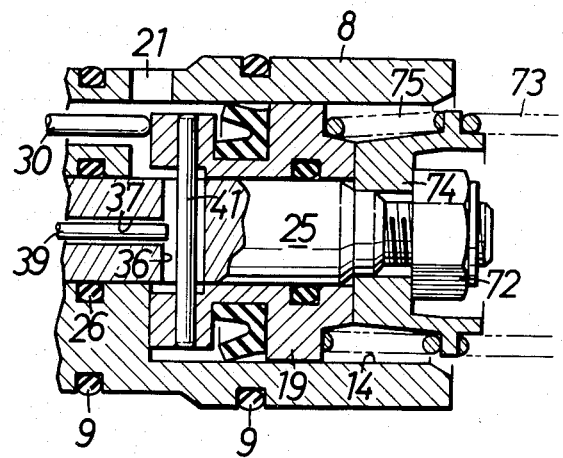
FIG. 3 is an enlarged view in vertical section of the details of a modification of the second embodiment.

In a modification of the second embodiment, a second spring 75 interposed between the second piston 19 and a receiving member 74 may be in the form of a coil spring, as shown in FIG. 3.

Figure 4:
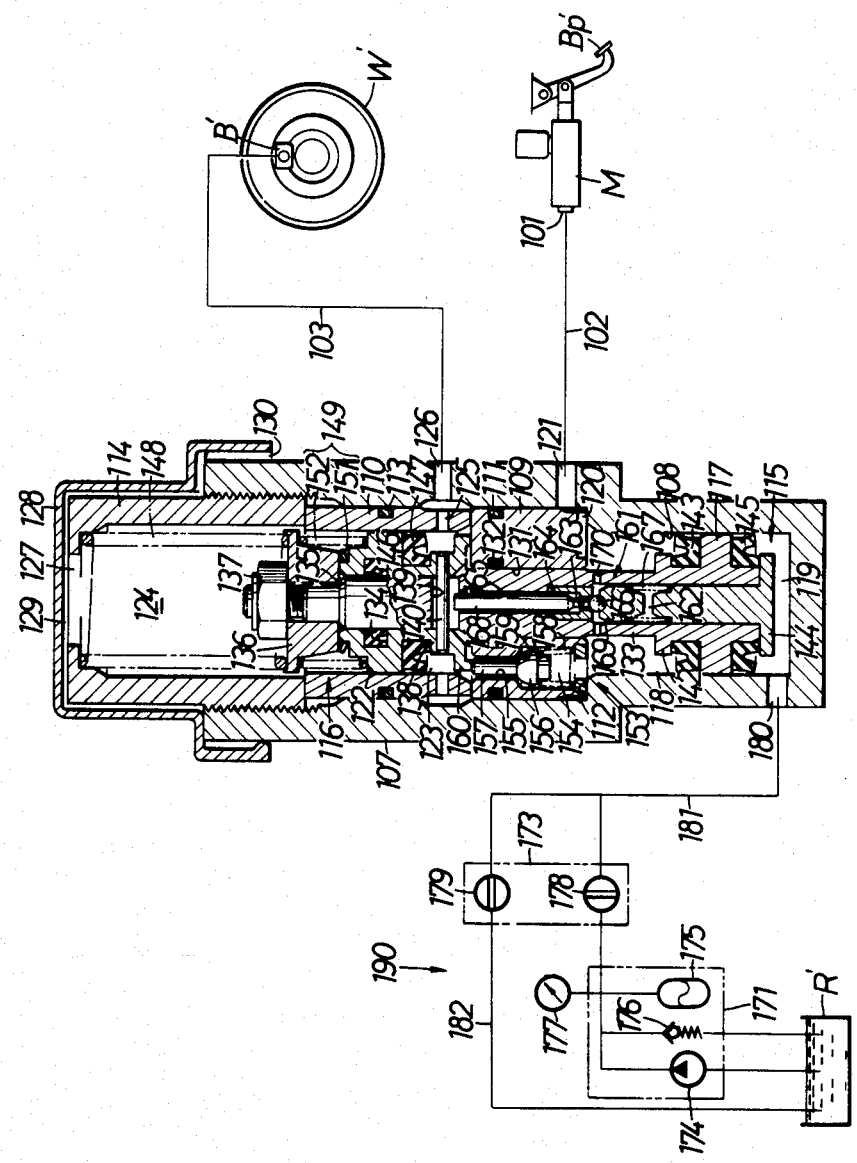
FIGS. 4 to 9 show a third embodiment of the present invention.

FIGS. 4 to 9 show a third embodiment of the present invention. Referring to FIG. 4, a casing 107 is provided between an oil passage 102 extending from an output port 101 of the master cylinder M and an oil passage 103 leading to a wheel brake B' mounted on a wheel W'.

The casing 107 is basically formed into a bottomed cylindrical shape with the upper end opened, and has a vertical bore 108 internally made therein, into which a disc-like partition 109 is first inserted and a cylindrical sleeve 110 is then inserted. The partition 109 is inserted into the bore 108 with an O-ring 111 interposed between the partition 109 and the inner surface of the bore 108 to abut against a stepped portion formed at the intermediate portion of the bore 108 to face upwardly. The sleeve 110 is also inserted into the bore 108 with an O-ring 113 interposed between the the sleeve 110 and the inner surface of the bore 108 to abut against the partition 109. A bottomed cylindrical cover member 114 is screwed into the opened end of the bore 108, so that the partition 109 and the sleeve 110 are clamped and fixed between the stepped portion 112 and the cover member 114 by tightening the cover member 114. It is to be noted that the sleeve 110 may be integrated with the partition 109.

The fixing of the partition 109 and the sleeve 110 in the bore 108 permits a first cylinder portion 115 below the partition 109 and a second cylinder portion 116 above the partition 109 to be concentrically defined within the casing 107.

A first piston 117 is slidably fitted into the first cylinder portion 115 to define an input hydraulic chamber 118 between the first piston 117 and the partition 109 and to define a control chamber 119 between the bottom of the casing 107 and the first piston 117. A notch is provided on the side surface of the partition 109 facing the input hydraulic chamber 118 for providing an oil passage 120 between the partition 109 and the stepped portion 112, so that the oil passage 102 connected to the master cylinder M is allowed to communicate with the input hydraulic chamber 118 through an inlet oil passage 121 made in the side wall of the casing 107 and the oil passage 120.

A second piston 122 having the same diameter as the first piston 117 is slidably fitted into the second cylinder portion 116 to define an output hydraulic chamber 123 between the second piston 122 and the partition 109 and to define a spring chamber 124 between the second piston 122 and the cover member 114. An oil passage 125 is made in the sleeve 110 to normally communicate with the output hydraulic chamber 123. An outlet passage 126 is made in the side wall of the casing 107 and is communicated with the output hydraulic chamber 123 through the oil passage 125 for connection to the oil passage 103 leading to the wheel brake B'. A bore 127 is made in the cover member 114 to lead to the spring chamber 124, and a gap 129 is defined between a cap 128 mounted over the cover member 114 on the casing 107 and the cover member 114. The cap 128 has a notch 130 for connecting the gap 129 with the outside, so that the spring chamber 124 is opened to the atmosphere. It is to be noted that bellows or the like may be mounted on the cover member 114 and the spring chamber 124 may be closed.

A through hole 131 is made in the central portion of the partition 109 to extend between the input hydraulic chamber 118 and the output hydraulic chamber 123, and a piston rod 133 is inserted into the through hole 131 with an O-ring interposed therebetween for axial movement. The piston 133 is integrally provided at its lower end with the first piston 117 and has the second piston 122 mounted on the upper end thereof with a sealing member 134 interposed therebetween for axial relative movement permitted in a limited range. The piston rod 133 is also provided at its upper end with a stepped portion 135 facing upwardly, and a receiving member 136 abutting against the stepped portion 135 is fixed on the upper end of the piston rod 133 by a nut 137.

Figure 5:
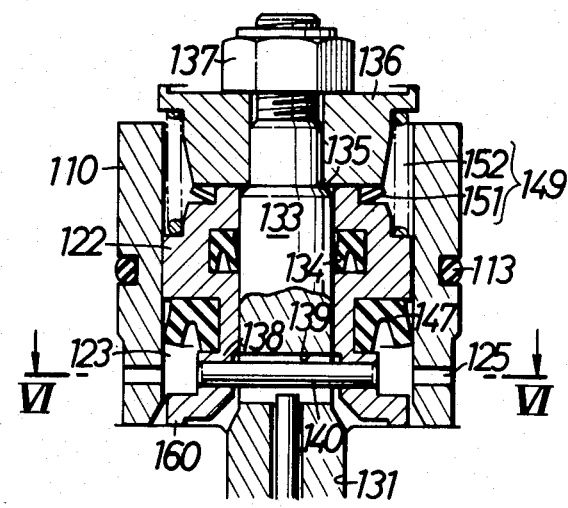

Referring to FIG. 5, the second piston 122 is integrally provided with a cylindrical portion 138 extending to the partition 109, and a retaining bore 139 is made corresponding to the cylindrical portion 138 in the piston rod 133 along a straight diametral line of the rod 133 to normally communicate with the output hydraulic chamber 123. The retaining bore 139 is defined into an ellipse configuration in cross section long in the axial direction of the piston rod 133 and has a rod 140 inserted therethrough which is fixed at its one or opposite ends to the cylindrical portion 138. Accordingly, the second piston 122 is permitted to move relative to the piston rod 133 in such a range that the rod 140 can move within the retaining bore 139 in the axial direction of the piston rod 133.

Figure 6:
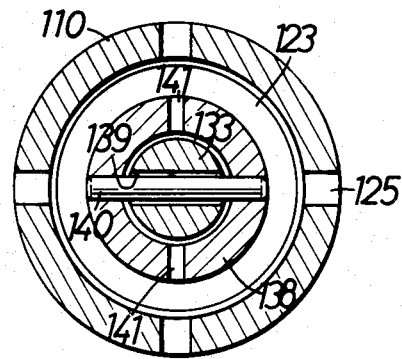

Referring to FIG. 6, an air vent hole 141 is perforated through the cylindrical portion 138 to connect the retaining bore 139 with the output hydraulic chamber 123.

Referring again to FIG. 4, The piston rod 133 is formed with a jaw 142 at a portion apart from the first piston 117 toward the partition 109, which jaw is adapted to abut against the partition 109 to restrict the upward movement of the piston rod 133. A sealing member 143 is fitted between the first piston 117 and the jaw 142, and a sealing member 145 is fitted between a blind cover 144 mounted on the lower end of the piston rod 133 and the first piston 117, both the sealing members 143 and 145 being in sliding contact with the inner surface of the casing 107. Further, the second piston 122 is provided at a portion close to the partition 109 with an annular groove 146 into which is fitted a sealing member 147 in sliding contact with the inner surface of the sleeve 110.

A coil-like first spring 148 is interposed between the receiving member 136, i.e., the piston rod 133 and the cover member 114, so that the piston rod 133 is biased downwardly, i.e., in the direction of the movement of the first piston 117 away from the partition 109 by the spring force of the first spring 148. A second spring 149 is also interposed between the receiving member 136, i.e., the piston rod 133 and the second piston 122 to relatively move the second piston 122 toward the partition 109 by the spring force thereof, and has a set load smaller than than that of the first spring 148.

Figure 7:
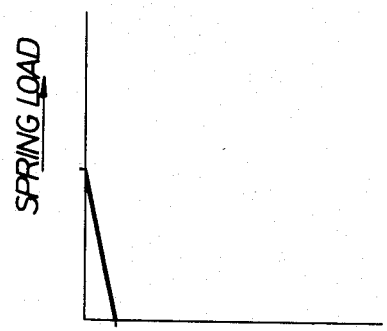
Figure 8:
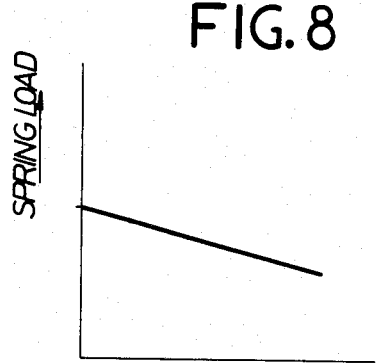
Figure 9:
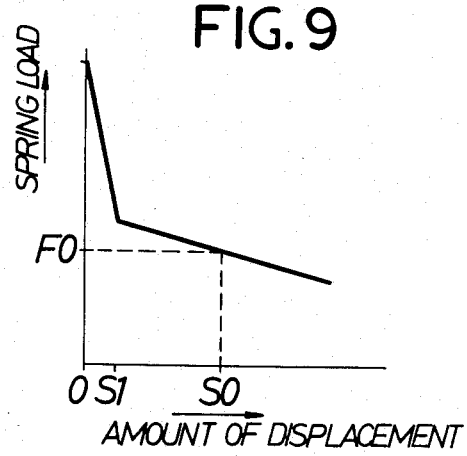

The second spring 149 is comprised of a first belleville spring element 151 and a second coil spring element 152 which are interposed in parallel between the receiving member 136 and the second piston 122. The characteristic of the first spring element 151 is determined to be large in spring constant but to be small in displacement, as shown in FIG. 7, while that of the second spring element 152 is to be small in spring constant but to be large in displacement, as shown in FIG. 8. Therefore, the characteristic of the second spring 149 is such that its spring load varies depending on a displacement, i.e., an amount of relative movement of the second piston 122 to the piston rod 133, as shown in FIG. 9.

A first valve mechanism 153 is provided in the partition 109 for bringing the input hydraulic chamber 118 into communication with, or blocking it from the output hydraulic chamber 123. The first valve mechanism 153 comprises a valve chamber 154 defined in the partition 109 to lead to the input hydraulic chamber 118, a valve bore 155 defined to extend between the valve chamber 154 and the output hydraulic chamber 123, a spherical valve body 156 contained in the valve chamber 154 to open or close the valve bore 155, a drive rod 157 integrated with the valve body 156 and passing through the valve bore 155 to project into the output hydraulic chamber 123, and a spring 158 for biasing the valve body 156 contained in the valve chamber 154 toward the valve bore 155. The valve chamber 154 is provided on its end surface on the side of the valve bore 155 with a conical seat 159 which gradually decreases in diameter towards the valve bore 155. The length of the drive rod 157 is set at a sufficient value such that when the second piston 122 has been displaced its maximum stroke toward the partition 109, the drive rod 157 is pressed by an urging portion 160 formed at the fore end of the cylindrical portion 138 of the second piston 122 to move the valve body 156 away from the valve seat 159.

A second valve mechanism 161 is provided in the piston rod 133. The second valve mechanism 161 comprises a valve chamber 162 which is normally in communication with the input hydraulic chamber 118, a cylindrical valve seat member 164 having a valve bore 163 concentric to the piston rod 133, a passage 165 connected to the valve bore 163 to connect the latter with the retaining bore 139, a spherical valve body 166 contained in the valve chamber 162 to open or close the valve bore 163, a spring 167 for biasing the valve body 166 toward the valve bore 163, and a drive rod 168 inserted into the passage 165 and the valve bore 163 for urging the valve body 166 to open the valve bore 163.

The valve chamber 162 is defined between the valve seat member 164 and the blind cover 144 by fitting the valve seat member 164 into a bottomed hole concentrically made in the lower end of the piston rod 133 and closing the opened end of the bottomed hole with the blind cover 144. The sealing between the valve chamber 162 and the passage 165 is effected by forcing the valve seat member 164 into the bottomed hole and fixing it therein, but a sealing member may be interposed between the outer surface of the valve seat member 164 and the inner surface of the bottomed hole to provide such sealing. A valve body receiver 169 for receiving the valve body 166 is contained in the valve chamber 162 for movement in the axial direction of the piston rod 133, and the spring 167 is interposed between the blind cover 144 and the valve body receiver 169. Also, a communication hole 170 is perforated through the piston rod 133, through which the valve chamber 162 is in communication with the input hydraulic chamber 118. A portion of the piston rod 133 at which is provided the communication hole 170 has a smaller diameter than that of the portion thereof which is in sliding contact with the inner surface of the through hole 131 in the partition 109.

The length of the drive rod 168 is set such that when its one end is in abutment against the closed valve body 166, the other end is protruded a given length into the retaining bore 139. Therefore, when the second piston 122 has been moved a given distance relative to the piston rod 133 away from the receiving member 136 toward the partition 109, the valve body 166 of the second valve mechanism 161 is pushed away from the valve seat member 164 by the drive rod 163 to open the valve.

In this case, the second piston 122 is moved so that the upward moving force therefor by the hydraulic pressure of the output hydraulic chamber 123 may be balanced with the downward moving force therefor by the spring force of the second spring 149, and the spring force of the first spring element 151 having a spring constant is exhibited at the start of the relative movement of the second piston 122. More specifically, as with a characteristic illustrated in FIG. 9, the second piston 122 is urged by the larger spring force until the amount of relative movement thereof becomes $S_1$ from zero. Then, the second piston 122 is urged by the second spring element 152 having a smaller spring constant and thus, the second valve mechanism 161 is opened when the amount of the relative movement of the second piston 122 has become $S_0$. The displacement of the second spring element 152 from $S_1$ to $S_0$ is set relatively larger and the spring load $F_0$ thereof at the time when the amount of the relative movement is $S_0$ is set at such a value that the second piston 122 can not be urged against the minimum hydraulic pressure in the output hydraulic chamber 123 during anti-lock operation. In other words, it is set such that although the hydraulic pressure of the output hydraulic chamber 123 needs to be reduced to mere several $kb/cm^2$ during anti-lock operation because of an extremely low coefficient of friction between the road surface and the tire when the vehicle is travelling on a frozen road, the second piston 122 will not be relatively moved to open the sound valve mechanism 161 in such case. However, it is a matter of course that such spring load $F_0$ is more than such a value to be able to drive the valve body 166 against an imaginary maximum braking hydraulic pressure in the input hydraulic chamber 118.

The control chamber 119 is connected with a source of control liquid pressure 171 and a reservoir 172 through valve meass 173 which constitutes anti-lock control means 190 together with the source 171 and the reservoir 172. The source of control liquid pressure 171 consists of a hydraulic pump 174 for pumping a control liquid, e.g., a working oil out of the reservoir 172, an accumulator 175 and a relief valve 176. The hydraulic pump 174 is adapted to be driven as required when the vehicle is being driven. The source of control liquid pressure 171 has an oil pressure sensor 177 associated therewith for sensing the trouble and loss of oil pressure of the hydraulic pump 174 as well as the operational initiation and stoppage of the latter.

The valve means 173 is comprised of a first solenoid valve 178 which is normally closed and a second solenoid valve 179 which is normally opened. When the wheel W' is about to be locked, the first solenoid valve 178 is opened and the second solenoid valve 179 is closed. The first solenoid valve 178 is provided in a feeding oil passage 181 which is connected to an oil passage 180 defined through the lower side wall of the casing 107 to connect the control liquid pressure source 171 with the control chamber 119. The second solenoid valve 179 is in a returning oil passage 182 which branches off from the feeding oil passage 182 between the first solenoid valve 178 and the control chamber 119 and leads to the reservoir 172.

In this third embodiment, it is to be understood that any of structures as proposed in the above first and second embodiments are provided and therefore the similar operations can be performed as in the proceeding embodiments so as to bring about the same effects.

In addition, in the hydraulic braking pressure control apparatus of this third embodiment, at the start of the movement of the second piston 122 relative to the piston rod 133, the second piston 122 is driven by a short stroke by the larger spring force of the first spring element 151 to overcome the force of friction due to the sealing member 134 and the like and thus, can start to move. After the second piston 122 started its movement, it is driven over a relatively long stroke by the smaller spring force of the second spring element 152 to close the second valve mechanism 161. Moreover, since the spring load of the second spring 149 when the second valve mechanism 161 is opened is determined at such a value as to be unable to move the second piston 122 against a hydraulic pressure as low as a few kb/cm² in the output hydraulic chamber 123 during anti-lock operation, for example, when the vehicle is travelling on a frozen road, it is possible to reconcile the anti-lock operation at the time when a coefficient of friction between the road surface and the tire is extremely low and the operation of the second valve mechanism 161.

Figure 10:
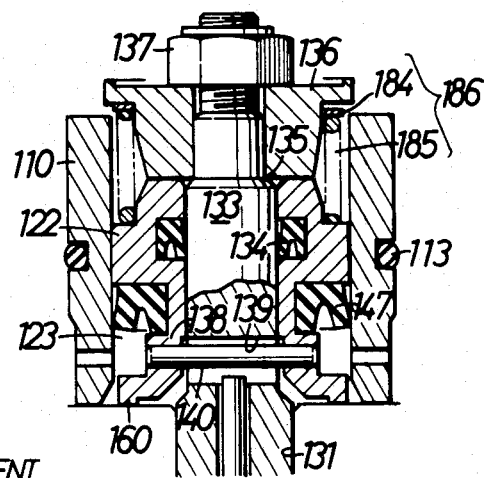
FIGS. 10 to 12 show one modification of the third embodiment.
Figure 12:
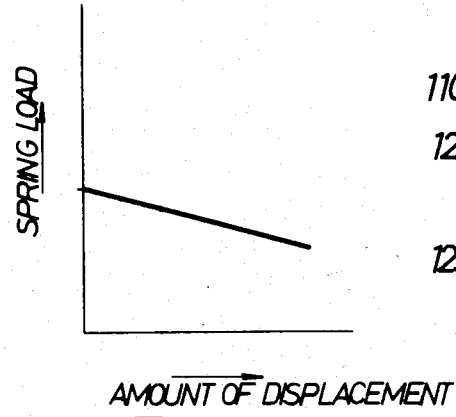
Figure 13:
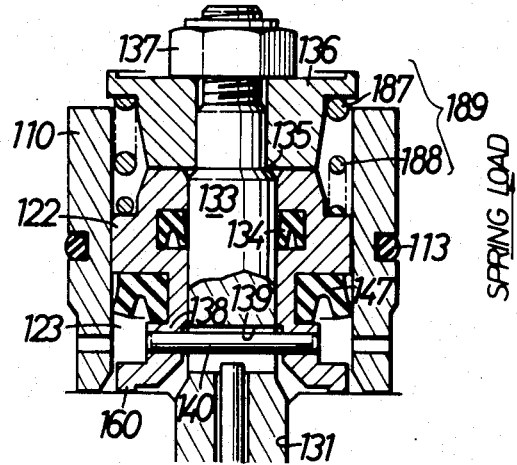
FIG. 13 is an enlarged view in vertical section of the details of another modification of the third embodiment.
Figure 11:
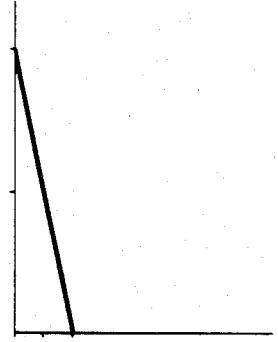

FIG. 10 shows a modification of the third embodiment, in which a second spring 186 is interposed between the receiving member 136 and the second piston 122. The second spring 186 comprises a first spring element 184 having a larger spring constant and a smaller displacement as shown in FIG. 11 and a scond spring element 185 having a smaller spring constant and a larger displacement as shown in FIG. 12, both the elements being provided in series. Moreover, the first spring element 184 has a set load determined larger than that of the second spring element 185. The characteristic of the second spring 186 is similar to that as shown in FIG. 9, thus making it possible to present the same effect as in the third embodiment.

In another modification of the third embodiment, a coil-type second spring 189 may be interposed between the receiving member 136 and the second piston 122, which spring comprises a first spring portion 186 having a larger spring constant and a smaller displacement and a second spring portion 188 having a smaller spring constant and a larger displacement, both the positions being connected together in series.

What is claimed is:

1. A hydraulic braking pressure control apparatus for vehicles, comprising: an input hydraulic chamber communicating with an output port of a master cylinder and an output hydraulic chamber communicating with a wheel brake and adapted to generate a hydraulic braking pressure corresponding to a hydraulic pressure in said input hydraulic chamber, said output hydraulic chamber being adapted to be enlarged in volume in accordance with a liquid pressure within a control chamber, which is adjusted by an anti-lock control means, when a vehicle wheel is about to be locked, wherein provided between said input and output hydraulic chambers are a first valve mechanism adapted to be closed in response to an increase in the liquid pressure of said control chamber and a second valve mechanism adapted to be opened to prevent the hydraulic pressure in said output hydraulic chamber from being reduced below a set value when said hydraulic pressure in said output hydraulic chamber falls below the level of said set value.

2. A hydraulic braking control apparatus according to claim 1, wherein a first cylinder portion and a second cylinder portion are concentrically provided through a partition within a casing interposed between the output port of said master cylinder and the wheel brake; a first piston is slidably fitted into said first cylinder portion to define said input hydraulic chamber on the side of said partition and said control chamber on a side of the piston far away from said partition; a second piston is slidably fitted into said second cylinder portion to define said output hydraulic chamber on the side of said partition and a spring chamber on a side of the second piston away from said partition, said first piston being securely mounted on one of opposite ends of a piston rod extending oil-tightly and movably through said partition, and said second piston being mounted on the other end of said piston rod for axial movement relative to said piston rod in a limited range; said first valve mechanism is provided in said partition and is operable to be closed in response to the movement of the second piston away from said partition; first and second springs are contained in said spring chamber for biasing said piston rod and said second piston toward said partition, respectively; and said second valve mechanism is provided in said piston rod and adapted to be opened to bring said input and output hydraulic chambers into communication with each other when the amount of movement of said piston rod relative to said second piston toward said spring chamber has become larger than a set value.

3. A hydraulic braking pressure control apparatus according to claim 2, wherein said second spring for biasing said second piston toward said partition is interposed between said second piston and said piston rod, a set load of said second spring being determined smaller than that of said first spring biasing said piston rod toward said partition.

4. A hydraulic braking pressure control apparatus according to claim 3, wherein said second spring is designed to exhibit a large spring force with a short displacement at the time of starting of the relative movement of said second piston toward said partition and to exhibit a small spring force with a relatively long displacement after the start of the relative movement.

5. A hydraulic braking pressure control apparatus according to claim 2, wherein said first spring has one end supported by a nut screwed to said piston rod, and said second spring has one end supported by abutting against said second piston.

6. A hydraulic braking pressure control apparatus according to claim 3, wherein said first and second springs each have one end supported on a receiving member fixedly held on said piston rod.

7. A hydraulic braking pressure control apparatus according to claim 4 or 6, wherein said second spring comprises a first spring element having a larger spring constant and a smaller displacement and a second spring element having a smaller spring constant and a larger displacement.

8. A hydraulic braking pressure control apparatus according to claim 7, wherein said first spring element is a Belleville spring, and said second spring element is a coil spring.

9. A hydraulic braking pressure control apparatus according to claim 7, wherein said first and second spring elements are comprised of coil springs connected in series to each other.

10. A hydraulic braking pressure control apparatus according to claim 1, wherein said second valve mechanism is adapted to open after closure of said first valve mechanism.

11. A hydraulic braking pressure control apparatus according to claim 2, wherein said second piston is designed to start movement relative to said piston rod toward said partition when the hydraulic pressure within said output hydraulic chamber has become smaller than the set load of said second spring.

* * * * *